3,095,461
PREPARATION OF 1-ALKENES
John B. Wilkes, Albany, Calif., assignor to California Research Corporation, San Francisco, Calif., a corporation of Delaware
No Drawing. Filed Jan. 5, 1961, Ser. No. 80,748
11 Claims. (Cl. 260—683.15)

This invention relates to a catalytic process for the production of 1-alkenes. More particularly, this invention relates to a process for the homo- and heteropolymerization of lower 1-alkenes i.e., 1-alkenes containing less than six carbon atoms, to produce compounded 1-alkenes in the range from about 5 to 12 carbon atoms which may be used for the production of high molecular weight hydrocarbon polymers.

Recently it has been disclosed in Serial No. 686,568 (U.S. Patent No. 2,986,588) by R. M. Schramm that propene may be dimerized and 4-methyl-1-pentent produced by the use of a potassium, rubidium, or cesium catalyst. In this respect it has been recognized that potassium, rubidium, and cesium behave differently than the lighter alkali metals to the extent that lighter alkali metals when employed as polymerization catalysts produce predominantly the internal olefins. Whereas the disclosure of Schramm is specific, that is, to the production of the hexene, 4-methyl-1-pentent, we have now found that with a particular type of catalyst system, the reaction may be broadened to encompass a considerable field of 1-alkene or alpha-olefin preparation, and at the same time, producing a process for the dimerization of propene which is markedly improved over the prior art processes.

It has now been discovered that by employing a specifically defined support for the potassium, rubidium, and cesium metals, a catalyst is developed which promotes selective production of $C_5$ to $C_{12}$ 1-alkenes through homo- and heteropolymerization of lower 1-alkenes. By lower 1-alkenes is meant 1-alkenes containing less than six carbon atoms. In accordance with this discovery and invention, lower 1-alkenes are heated in the presence of a catalyst component containing an alkali metal having an atomic number greater than 18 and with particular reference to potassium, rubidium, and cesium disposed upon a solid crystalline and porous metal silicate. By the use of the catalyst composition of the present invention, it is possible to provide a homo- and heteropolymerization process which is characterized by practical conversion rates, long catalyst lives and high catalyst selectivities, which characteristics are consistently obtained in the production of compounded 1-alkenes.

In general, the process of the invention involves the homo- and heteropolymerization of lower 1-alkenes by contacting the olefins with a catalyst composition composed of an active base metal of the class of potassium, rubidium, and cesium supported by a solid crystalline and porous metal silicate. The reaction is generally conducted at temperatures from about 150° to 400° F. and at elevated pressures. As previously indicated, the important aspect of the process which permits the homo- and heteropolymerization of the lower 1-alkenes to produce compounded 1-alkenes is the particular type of support employed for the active potassium, rubidium, and cesium catalyst components. The preferred form of catalyst supports are the alkali and alkaline earth metal silicates, e.g., the silicates of the group I and II elements of the periodic table which have surface areas greater than about 0.3 square meter per gram. These alkali metal, alkaline earth metal and mixed alkali metal and alkaline earth metal silicates are used in the form of substantially crystalline and anhydrous solids, although stable water of crystallization is permissible. They may be of natural or synthetic origin. Particularly useful are the synthetic silicates obtained by the hydrothermal treatment of silicas with hydrated metal oxides of the above class of metals. Such materials are substantially free of so-called acid sites of the types found in activated silica-alumina catalysts. Best results are obtained from the metal silicates of the present invention which, when placed in water, have no effect upon the pH thereof or do not cause it to be less than 7.

Among the materials contemplaed as supports useful in the process of the present invention are the porous and crystalline meta-silicates and ortho-silicates of the alkali metal and alkaline earth metals, as well as the dihydrogen silicates of the corresponding metals. The most preferred supports are the porous, crystalline, alkaline earth metal silicates which may be used per se or in combinations with other metal silicates. Representative of these preferred supports are the natural alkaline earth metal silicates such as talc, clinoenstatite, phenacite, bertrandite, anorthite, wollastonite, and pseudowollastonite and the like, as well as the porous synthetic alkaline earth metal silicates, the Celkates, the Silenes, the Microcels and the like. Further illustrations of the metal silicates which may be used as the support material are such silicates as macrocline, mullite, muscovite, orthoclase, willemite, hemimorphite, and other natural silicates, as well as the porous crystalline silicates of cadmium, manganese, lead, zinc, etc. The support materials as employed in the process of the present invention are substantially anhydrous and vary in size from mere colloidal dimensions to pellets of macro dimensions, depending upon the reaction system used. For example, in a slurry system, optimum results are obtained where the support is particulate matter having diameters of from about 1 to 100 microns and preferably from about 1 to 10 microns. For fixed bed operation, it is preferred that the porous support material be from about 2 to 10 mm. and larger in diameter and that it have a surface area as measured by the BET method (H. Brunauer, P. H. Emmett and E. Teller, J.A.C.S. 60, 309 (1938); H. Brunauer, "The Adsorption of Gases and Vapours," Oxford University Press, N.Y., 1945) which is below about 35 square meters per gram and average pore diameters greater than about 1200 A.

Various methods may be used for the disposition of the active component on the metal silicate support material. The metal in the molten state is contacted with a support under an inert atmosphere such as nitrogen with mixing by mechanical means. Directionally as the particle size of the support is decreased, there is an increase in the amount of potassium which may be stably supported per unit weight of supporting material. For example, in a slurry system having particle sizes of from about 1–100 microns, the amount of potassium which may be stably supported is in the range of from 50 to 140 weight percent based upon the support. For larger particle sized metal silicate supports, the relative amounts of supportable potassium metal are less, but are nevertheless markedly greater than may be obtained with other materials such as alkali metal halides, carbonates, quartz, silica and the like.

While potassium is indicated as the active material which is placed upon the support to yield a dispersed potassium on a porous metal silicate catalyst system, it should be recognized that the active component may also exist in the form of the alkali metal hydride or the corresponding organo-metallo derivative. Thus, part or all of the alkali metal may be present in the catalyst composition in the form of the alkali metal hydride and/or as an organo-metallo material such as the allyl, cyclohexyl, propyl, amyl, and similar alkyls of the corresponding alkali metals.

The reaction rate is roughly proportional to the pressure, and thus it is advantageous to operate at elevated pressures. Further, it is desirable to have an appreciable partial pressure of olefin feed in the reaction zone at all times. Both the reaction rates and yields of compounded 1-alkenes are improved with an increase in partial pressure or concentration of the lower 1-alkene feeds in the reaction zone. Where the polymerization is to be carried out in a gas phase—solid phase reaction system, and the temperature employed exceeds the critical temperature for the hydrocarbon components of the system, the upper limit for the pressure in the reaction zone becomes a matter of practicality concerning the strength of materials of construction and the increased costs therefor. All other operations will be conducted at intermediate reaction zone pressures and the governing factors will be whether or not it is desirable to have a liquid phase in the reaction zone and how the product is to be removed from the reaction zone.

The polymerization may be accomplished at a solid-gas interphase in the absence of a liquid reaction medium by contact of the simple olefins with the catalyst either in a fixed bed or as a fluid bed type operation. In a preferred manner the polymerization is accomplished in an inert medium wherein the catalyst is finely divided, and the inert medium is saturated aliphatic and cycloaliphatic hydrocarbons. Refined hydrocarbons such as white oils, paraffins, decahydronaphthalenes, cyclohexane, methylcyclohexane and the like are especially desirable media for the slurry type system. By the term "refined" is meant the treatment of said hydrocarbons with strong acids such as sulfuric acid, percolation through active clays or silica gel, or other means to remove aromatics and those materials containing oxygen, sulfur, and nitrogen. Aromatics such as benzene, toluene, xylenes, and the like are undesirable in the medium because of their tendency to promote agglomeration of the catalyst particles, as well as other undesirable side reactions. The net effect of such agglomeration is the appreciable reduction in catalyst activity and catalyst half life.

While the process may be a batch operation, the practical commercial operation and preferred method is the continuous process run at partial conversions because an appreciable partial pressure of olefin monomer inhibits the tendency of a supported alkali metal to catalyze the isomerization of olefins. The further advantage and result of a continuous operation at partial conversion is the recycle stream and its mechanical effect wherein the entering gas stream maintains the catalyst well distributed in the medium, minimizes settling and a tendency for agglomeration. However, it should be recognized that this effect may also be accomplished by mechanical means. A further advantage of operation at partial conversion with recycle is the desirability to minimize the residence time of the 1-alkene product in the reaction zone in order to minimize the possible isomerization reaction which converts 1-alkenes to undesirable internal olefins.

The amount of the alkali metal to be used in relation to the weight of support may vary depending upon the particular support to be employed. From considerations of reactor efficiencies based on the rate of production of olefin dimer or heteromer, that is, intercondensation between two different olefin molecules, per unit of reactor volume, it is desirable to maximize the amount of the alkali metal per unit weight of metal silicate support. It is preferred to employ a catalyst composition containing at least 10 percent by weight of the alkali material. The upper limit in the placement of alkali metal on a support is functional and depends upon the natural capacity of the metal silicate support and the tendency of the supported alkali metal to agglomerate when a certain load factor is exceeded. Drastic catalyst activity decline and reactor plugging directly follow from catalyst agglomeration. Thus, while a metal silicate having a particle size in the 1–10 micron diameter range has a capacity for potassium which may exceed about 150 weight percent of the support, only about 125 weight percent or less of potassium is desirably placed upon the support because at higher load factors, the agglomeration of the catalyst is appreciable.

The porous and crystalline alkali and alkaline earth metal silicates are superior supports for the alkali metals of the present invention. They are easily prepared and the support retains the metal under severe conditions of attrition. By the term "porous material" is meant one having surface areas in square meters per gram of about 0.3 and greater.

The use of porous alkali metal silicates as supports in the present 1-alkene process should be qualified by the condition that when the particle size of the support exceeds about a 0.01 cm. diameter, the surface area should be less than about 35 square meters per gram. The large particle size supports having large surface areas produce substantially less 1-alkene. A further requirement related to the surface area effect is that supports having particle size diameters above about 500 microns should not have average pore diameters less than about 1200 A. units, where average diameter, $\bar{d}=4V_g/S_v$, and where $V_g$ equals pore volume per gram of support and $S_v$ equals the surface area per gram of support. Surface areas of the supports are measured by the BET nitrogen absorption method referred to above, and pore volumes may be measured by the absorption of carbon tetrachloride after having refluxed the carbon tetrachloride to displace air from the solid or other known methods.

Suitable support materials for the potassium catalysed polymerization of lower alkenes to produce compounded 1-alkenes must result in catalysts that are highly selective, are capable of high rates of production, and have long catalyst half-lives. By selectivity is meant the ability to yield a product which is substantially 1-alkene rather than internal olefin. By high rates of production is meant a production rate of at least 4.0 grams of dimer per hour per gram of supported potassium in propene dimerization. By long catalyst half-life is meant the ability of a particular catalyst combination support and potassium metal, to produce at least 200 pounds of propene dimer, 4-methyl-1-pentene, per pound of supported potassium metal in the first catalyst half-life. A catalyst half-life is the production period during which the catalyst activity declines to a value which is one-half the initial activity.

No alkali metal support known to the art satisfies all of these requirements. As shown in the examples listed in Table I, a few exhibit good selectivity but fall down in 1-alkene production rate (Table II) or exhibit poor catalyst half-lives. Thus potassium carbonate, quartz and other inert non-porous materials may exhibit good selectivities but support only limited amounts of potassium per unit weight of support material and exhibit relatively poor catalyst half-lives. In addition, when these materials are used as supports in the highly desirable particle sizes ranging from colloidal dimensions up to about 100 microns, it is found that frequently a catalyst deactivating reaction occurs between the alkali metal and the support material. This is particularly true when finely divided silicon dioxide is used as the support material. Violently exothermic reaction occurs at temperatures otherwise desirable for 1-alkene dimerization.

The porous crystalline alkali metal and alkaline earth metal silicates exhibit excellent selectivity, production rates, and have long catalyst half-lives, and are stable, effective, support materials over a wide range of temperature. Thus no significant loss of potassium activity was noted where potassium metal supported upon representative silicate materials was maintained at 150° C. in an inert hydrocarbon medium for 72 hours.

Superior catalyst half-lives may be experienced with the porous crystalline alkali metal and alkaline earth metal silicates. Magnesium-aluminum silicate, talc, exhibits a half-life of better than 1000 pounds of propene dimer per pound of supported dimer.

TABLE I

*Dimerization of Propene, 300° F., White Oil Medium*

| Support | 1-alkene Yield, Percent |
| --- | --- |
| Talc (Calcium, Magnesium, Al Silicate) 1-10 microns Porous and crystalline | 90+ |
| Potassium Carbonate Powder, nonporous | 80 |
| Quartz, (SiO$_2$), 0.6 mm., nonporous | ~83 |
| Amorphous Alkali Metal Silicate | <1 |
| Activated Carbon | <5 |
| Alumina, Gamma Activated, acidic | <1 |
| Silica Gel | <1 |
| Calcium Silicate (Silene) | 82+ |
| Metal Powder, Zinc | 0 |
| Calcium Silicate, Wollastonite | 82+ |

TABLE II

*Propene Dimerization*

| Support | Particle Size, Microns | Induction Period, Hours | Dimerization Rate, g. C$_3$H$_6$/g. K, hr. |
| --- | --- | --- | --- |
| K$_2$CO$_3$ | 1-4 | 7 | 1.1 |
| Ca Silicate (Microcel B) | 2-6 | 0 | 5.3 |
| Mg Silicate (Celkate) | 2-6 | 0 | 4.7 |
| Mg Al Silicate (Talc) | 1-3 | 0 | 4.7 |

Conditions: White oil medium, 4 g. of supported potassium in 100 cc. white oil, 135 g. propene, 300° F., pressure ranged from 1200-600 p.s.i.g.

EXAMPLE 1.—CATALYST PREPARATION

In a typical catalyst preparation the support material in a finely divided state of subdivision, e.g., below about 100 micron diameter particles is mixed with an inert hydrocarbon diluent, for example, a refined paraffinic white oil, in a ratio by weight of about 85 to 15 parts, oil to solid respectively, and the resulting slurry is ball-milled. The time required to complete the ball-milling varies depending upon the nature of the support material; the usual time requirement is about 30 minutes to 1 hour, but it may be easily and quickly determined by inspection of small aliquots of the slurry with a calibrated microscope. When the particle sizes are substantially all below about a 10 micron diameter, the slurry is transferred to a vessel fitted with a high speed stirrer. The vessel and contents are heated to a temperature above the melting point of the particular alkali metal being used and the metal is divided into three portions and added incrementally with an interval of about 5 minutes between each addition. When the last addition has been made followed by a period of about 5 minutes' stirring, oleic acid in the amount of about 2 weight percent based upon the potassium used is added to the medium and the stirring continued for a short period.

Using the above technique with and without the milling step, a variety of alkali metal silicate supported potassium metal polymerization catalysts were prepared and tested in the dimerization of propene at 300° F., 1100 p.s.i.g. and in a white oil medium as listed in the following table in which the term "excellent" selectivity means the product is greater than 60% 1-alkene and as applied to catalyst half-life means that greater than 200 lbs. of 1-alkene dimer per pound of potassium per initial catalyst half-life is obtained:

TABLE III

*Propene Dimerization Characteristics*

| Support | Particle Size, Microns | Approximate Surface Area, M.$^2$/Gr. | Catalyst Selectivity | Half-Life |
| --- | --- | --- | --- | --- |
| Calcium Silicate | ~150 | 125 | Excellent | Excellent. |
| Do | 30 | 74 | do | Do. |
| Do | 1-4 | 125+ | do | Do. |
| Wollastonite | 3-20 | <5 | do | Do. |
| Magnesium Silicate | ~200 |  | do | Do. |
| Do | 6-150 | 172 | do | Do. |
| Do | 2-6 |  | do | Do. |
| Magnesium-Aluminum Silicate | 1-6 | 4 | do | Do. |

EXAMPLE 2

In the manner described in Example 1 a catalyst was prepared using a previously dried commercial grade talc, a natural crystalline silicate having a surface area of about 3.8 m.$^2$ per gram and which consisted of a mixture of calcium, magnesium and aluminum silicates upon which an equal weight of potassium metal had been disposed. This catalyst was placed in a 10 gallon reactor vessel and used to catalyze the dimerization of propene under the conditions and with the results indicated in Table IV below.

TABLE IV

Reactor conditions:
Temperature, ° F. _____ 300
Pressure, p.s.i.g. _____ 600
Feed purity, percent propene _____ 99+
Gas recycle, c.f.h. _____ 40-60
Charge:
Potassium, lb. _____ 1.0
Talc, lb. _____ 1.0
White oil, gal. _____ 4
Oleic acid, oz. _____ 0.3
Initial activity, lb. C$_3$H$_6$ conv./(hr.) (lb. K)_ 4.0
Extrapolated half-life, hr. _____ 600+
Initial conversion, wt. percent _____ 10
Yield, 1-alkene, percent _____ 87-93
    4-methyl-1-pentene _____ 82-86
    1-hexene _____ 5

From the foregoing, it can be seen that the catalyst will produce about 600 pounds of dimer during the first half-life. Of this material, about 82 percent will be 1-alkene consisting of 4-methyl-1-pentene and 1-hexene in a weight ratio of 82 to 5 respectively. The 82 percent figure rather than the 87 percent initially experienced results from a small decrease in catalyst selectivity as it ages in use.

Similar results are obtained when other porous, crystalline alkali metal and alkaline earth metal silicates and their mixtures are used as supports for the polymerization of lower 1-alkenes to produce dimers and heteromers as with ethene. Other examples indicative of the scope of the present invention but not meant to limit it, follow:

EXAMPLE 3

The alpha-olefin, 1-pentene, was prepared in a batch run by the catalyzed reaction of propene with ethene. The catalyst consisted of 3 g. of potassium metal dispersed upon 3 g. of calcium silicate having a surface area of about 120 square meters per gram and particle diameters of about 60 microns. The catalyst, 32 grams of ethene, 1.1 mols, and 106 grams, 2.5 mols of propene were contacted in the presence of a white oil medium in an autoclave at the ambient temperature. The mixture was stirred and heated and when the temperature had increased to about 250° F., reaction commenced. There-after, the temperature increased rapidly until after a period of about 15 minutes, the temperature in the reaction zone was 327° F. and the reaction was 97 percent complete based upon the ethene charged. The product was analyzed by gas-liquid partition chromatography (GALIPA) using known standards and found to be of the following composition:

|   | Percent |
|---|---|
| 1-pentene | 38 |
| 4-methyl-1-pentene | 9 |
| 2-pentene | 42 |
| 4-methyl-2-pentene | 1 |
| Other | 11 |

When the above reaction system is varied by carrying it out under the conditions of a continuous process keeping conversions less than about 50 percent and LHSV's in the range 0.1 to 10, and by operating in a lower temperature range, for example, of from about 240–280° F. and about a 1:1 mol ratio of ethene to propene, the yield of 1-pentene is substantially higher and by-product production is correspondingly minimized.

EXAMPLE 4

A catalyst prepared as in Example 1 consisting of 2 grams of potassium metal disposed upon 2 grams of talc together with about 100 cc. of refined white oil was placed in a 600 ml. rocking autoclave under an atmosphere of nitrogen. Then 74 g. of propene and 47 g. of ethene were charged. The reaction mixture was heated with mixing. When the temperature reached 240° F. reaction was noted and this temperature was maintained for 4½ hours. The initial and final pressures were 1,375 and 665 p.s.i.g. respectively. By conventional means 75 cc. of liquid hydrocarbon were recovered and analysed by gas-liquid partition chromatography. The composition:

|   | Percent |
|---|---|
| 1-pentene | 69.7 |
| Trans-2-pentene | 13.4 |
| Cis-2-pentene | 12.2 |
| 4-methyl-1-pentene | 1.4 |
| n-Hexene | 2.4 |

EXAMPLE 5

Isobutene, ethene and a supported potassium catalyst were brought into contact in a 630 ml. autoclave. The support used was 10 grams of a porous magnesium silicate of a particle diameter ranging from about 6–150 microns upon which 5 grams of potassium metal had been dispersed. The catalyst, the medium, 95 grams, 1.7 mols, of isobutene and 49 grams, 1.8 mols of ethene were charged to the 630 ml. rocking autoclave at the ambient temperature. While shaking the autoclave, the reactor and contents were heated. At a temperature of about 250°–280° F., the reaction was completed in about 20 minutes. A good yield of 1-alkene was obtained. The product was about 40% $C_6$ olefin with the balance being a mixture of $C_8$ through $C_{12}$ molecular weight olefins.

EXAMPLE 6

Metallic cesium and rubidium were tested for catalytic activity for the production of 1-alkenes. The supporting material used was a high surface area, 125 square meters per gram, small particle size, 60 microns diameter, calcium silicate. A 6.0 gram ampoule of the metal was broken in a refined white oil in the presence of 6.0 grams of the support. A few minutes of high speed stirring while the temperature of the mixture was maintained from about 10–50° C. above the melting point of the respective metal sufficed for the preparation of the catalyst dispersion.

In the test, the catalyst was divided and two separate runs were made. A 630 ml. autoclave was charged with 200 cc. of white oil, 6 grams of catalyst and propene was added sufficient to exert a pressure of 1200–1230 p.s.i.g. The autoclave was heated and maintained at 300° F. with shaking until about 40 percent of the charged propene was converted to dimer. On a mol basis, the relative rates of K:Rb:Cs in the dimerization were 1.0:0.9:1.7, respectively. Although the cesium and rubidium catalysts produced good yields of 1-alkenes, they were not as selective as potassium in their action in batch runs, but when used in continuous runs, the selectivity is improved.

Thus, the process of the present invention produces in a practical manner highly desirable 1-alkene intermediates useful in the production of high molecular weight hydrocarbon polymers such as those obtained by the use of Ziegler type processes. It is especially useful for the production of those polymers were the nature and physical characteristics of the polymer are particularly dependent upon the purity of the 1-alkene monomer feed.

As many apparently widely different embodiments of this invention may be made without departing from the spirit and scope thereof, it is to be understood that the invention is not limited to the specific embodiments thereof except as defined in the appended claims.

I claim:

1. A process for the homo- and heteropolymerization of lower 1-alkenes which comprises contacting a 1-alkene feed containing less than six carbon atoms with a catalyst which comprises an alkali metal selected from the group consisting of potassium, rubidium, and cesium supported upon a crystalline porous material selected from the class consisting of alkali and alkaline earth metal silicates, effecting said contact at a temperature between about 150° F. to 400° F. and recovering a compounded 1-alkene having from five to twelve carbon atoms.

2. The process of claim 1 wherein said support material is dispersed in a saturated hydrocarbon medium, has a particle diameter in the range from about 1 to 100 microns and has disposed thereon said alkali metal in the weight ratio of from about 10 to 125 parts per 100 parts of said support material.

3. The process of claim 1 wherein said support material has a particle diameter in the range from about 500 microns to about 10 mm., a surface area in square meters per gram of from about 0.3 to 35 and an average pore diameter greater than about 1200 A.

4. The process of claim 1 wherein said feed is propene.

5. The process of claim 1 wherein said feed is propene and ethene.

6. The process of claim 1 wherein said feed is isobutene.

7. The process of claim 1 wherein said feed is isobutene and ethene.

8. The process of claim 1 wherein said feed is propene and a butene.

9. The process of claim 1 wherein said support is a magnesium silicate.

10. The process of claim 1 wherein said support is calcium silicate.

11. The process of claim 2 wherein said support is talc.

References Cited in the file of this patent

UNITED STATES PATENTS

| 2,466,694 | Freed | Apr. 12, 1949 |
| 2,986,588 | Schramm | May 30, 1961 |